United States Patent
Lee

(10) Patent No.: US 11,654,857 B2
(45) Date of Patent: May 23, 2023

(54) AIRBAG APPARATUS OF VEHICLE

(71) Applicant: HYUNDAI MOBIS CO., LTD., Seoul (KR)

(72) Inventor: Dong Oh Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/654,770

(22) Filed: Mar. 14, 2022

(65) Prior Publication Data

US 2022/0306031 A1 Sep. 29, 2022

(30) Foreign Application Priority Data

Mar. 24, 2021 (KR) .................. 10-2021-0038097

(51) Int. Cl.
*B60R 21/214* (2011.01)
*B60R 21/2334* (2011.01)
*B60R 21/015* (2006.01)

(52) U.S. Cl.
CPC ...... *B60R 21/214* (2013.01); *B60R 21/01516* (2014.10); *B60R 21/2334* (2013.01)

(58) Field of Classification Search
CPC .................................................. B60R 21/214
See application file for complete search history.

(56) References Cited

U.S. PATENT DOCUMENTS

| | | | | |
|---|---|---|---|---|
| 10,807,556 B2* | 10/2020 | Hill | ................... | B60R 21/26 |
| 11,014,523 B2* | 5/2021 | Min | ................... | B60R 21/261 |
| 11,148,632 B2* | 10/2021 | Karuppaswamy | .... | B60R 21/213 |
| 11,214,227 B2* | 1/2022 | Jayakar | ................ | B60R 21/232 |
| 11,254,277 B2* | 2/2022 | Jeong | ................ | B60R 21/013 |
| 2018/0162315 A1* | 6/2018 | Lee | ................... | B60R 21/2346 |
| 2018/0312130 A1* | 11/2018 | Min | ................... | B60R 21/13 |
| 2019/0016292 A1* | 1/2019 | Son | ................... | B60R 21/262 |
| 2021/0138987 A1* | 5/2021 | Lee | ................... | B60R 21/2334 |
| 2021/0138996 A1* | 5/2021 | Min | ................... | B60R 21/2646 |
| 2021/0155197 A1* | 5/2021 | Jeong | ................ | B60R 21/2334 |
| 2021/0179004 A1* | 6/2021 | Lee | ................... | B60R 21/214 |
| 2021/0245692 A1* | 8/2021 | Lee | ................... | B60R 21/013 |

FOREIGN PATENT DOCUMENTS

| | | | | | |
|---|---|---|---|---|---|
| CN | 111886160 A | * | 11/2020 | ............ | B60R 21/214 |
| DE | 102017128085 A1 | * | 1/2019 | ............ | B60R 21/20 |
| DE | 202019000013 U1 | * | 3/2019 | ............ | B60R 21/213 |
| DE | 102019111069 A1 | * | 11/2019 | ........ | B60R 21/01512 |
| DE | 202019106027 U1 | * | 12/2019 | ............ | B60J 7/043 |
| DE | 202020107503 U1 | * | 4/2021 | ............ | B60R 21/213 |
| DE | 202021106300 U1 | * | 1/2022 | ............ | B60R 21/231 |
| KR | 10-1382293 | | 4/2014 | | |
| KR | 102288752 B1 | * | 8/2021 | | |
| KR | 20210101031 A | * | 8/2021 | | |
| KR | 20210114297 A | * | 9/2021 | | |
| KR | 20220011419 A | * | 1/2022 | | |
| KR | 20220046940 A | * | 4/2022 | | |
| KR | 20220054035 A | * | 5/2022 | | |
| KR | 20220098974 A | * | 7/2022 | | |
| WO | WO-2020193359 A1 | * | 10/2020 | ............ | B60R 21/01 |

* cited by examiner

*Primary Examiner* — Nicole T Verley
(74) *Attorney, Agent, or Firm* — DLA Piper LLP (US)

(57) ABSTRACT

An airbag apparatus of a vehicle. In the airbag apparatus, a plurality of inflators is connected to a roof airbag, and the plurality of inflators is selectively operated according to the information of an occupant boarded in the vehicle, whereby the roof airbag expands to optimize for the occupant in the vehicle and safely protects the occupant.

6 Claims, 4 Drawing Sheets

AIRBAG APPARATUS OF VEHICLE

CROSS REFERENCE TO RELATED APPLICATION

The present application claims priority to Korean Patent Application No. 10-2021-0038097, filed Mar. 24, 2021, the entire contents of which is incorporated herein for all purposes by this reference.

BACKGROUND OF THE INVENTION

Field of the Invention

The present invention relates generally to an airbag apparatus of a vehicle, the airbag apparatus being configured to safely protect an occupant in the vehicle in an event of a vehicle collision.

Description of the Related Art

Various airbags are provided in vehicles to protect occupants in the event of a collision. Among the various airbags, a roof airbag prevents an occupant from being thrown out of the vehicle while the occupant moves toward a roof or from being injured by debris generated from the roof in an event of a vehicle collision.

Specifically, the roof airbag is unfolded to cover the indoor roof. When a number of occupants are boarded in the vehicle, the occupants cannot be safely protected only by a preset supporting force of the roof airbag. In the case of the roof airbag, the protection performance deteriorates as the number of occupants in the vehicle is increased as the roof airbag is unfolded with an unfolding force according to an initial design thereof.

The foregoing described as the controller and the controlling method of operating a fuel cell is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problem occurring in the related art, and the present invention is intended to provide an airbag apparatus of a vehicle, wherein a roof airbag configured to be unfolded toward an indoor roof in an event of a vehicle collision safely protects an occupant with an expansion force controlled according to information of the occupant.

In order to achieve the above objective, according to one aspect of the present invention, there is provided an airbag apparatus of a vehicle, the airbag apparatus including: an airbag cushion provided at an indoor roof, and configured to be unfolded along the roof and to cover the roof; a plurality of inflators connected to the airbag cushion and configured to supply gas into the airbag cushion, and to be individually operated; and a controller configured to receive information about an occupant, and to determine operation of each of the inflators in response to whether a vehicle collision occurs, and to determine number of operated inflators according to the information of the occupant in an event of a vehicle collision.

The controller may be configured to receive information about the number of occupants by a detection sensor provided in a vehicle room, and the number of operated inflators may be increased in response to the number of occupants.

The controller may be configured to receive weight information of the occupant by a detection sensor provided in a vehicle room, and the number of operated inflators may be increased in response to the weight of the occupant.

The controller may be configured to operate the plurality of inflators such that the plurality of inflators may be operated successively at preset time intervals.

The airbag apparatus may include: guide wires respectively provided at opposite portions of the roof, and extended along the roof, and slidingly connected to opposite ends of the airbag cushion so as to guide unfolding of the airbag cushion; and guide holders respectively connected to ends of the guide wires, and configured to apply tension to the guide wires.

Each of the guide holders may include: a housing mounted to the roof and having an inside portion; a slider connected to each of the guide wires, the guide wires being inserted into the inside portion of the housing while passing through the housing, the slider being configured to be moved in the inside portion of the housing; and a spring provided in the inside portion of the housing and configured to elastically support the slider.

Each of the guide holders may include a displacement sensor configured to measure shift displacement of each of the guide wires, and the controller may be configured to receive information in response to the shift displacement of each of the guide wires measured by the displacement sensor, to operate a specific one of the inflators in an event of a vehicle collision to allow the airbag cushion to be unfolded, and to operate a remaining inflator of the inflators when the shift displacement of the guide wire is equal to or higher than a preset displacement.

In the airbag apparatus of a vehicle, which is configured as described above, the plurality of inflators is connected to the roof airbag and is selectively operated according to the information of the occupant boarded on the vehicle room, so that the roof airbag can expand to be optimized for the occupant to safely protect the occupant.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Hereinbelow, an airbag apparatus of a vehicle according to an exemplary embodiment of the present invention will be described with reference to accompanying drawings.

Figure 1:
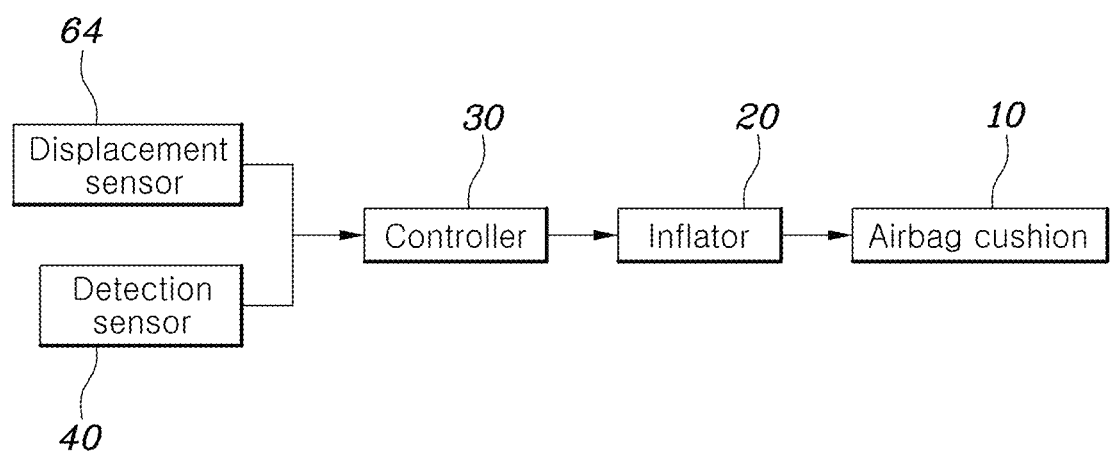
FIG. 1 is a block diagram showing an airbag apparatus of a vehicle according to the present invention.
Figure 2:
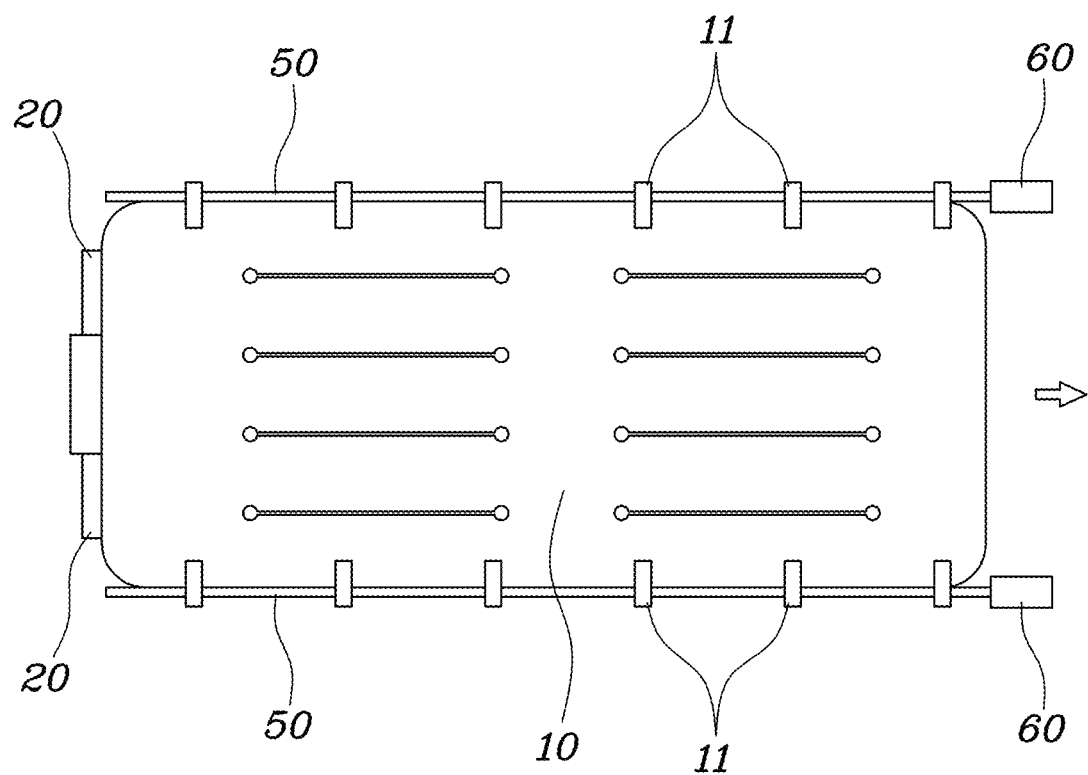
FIG. 2 is a view showing the airbag apparatus of a vehicle shown in FIG. 1.
Figure 3:
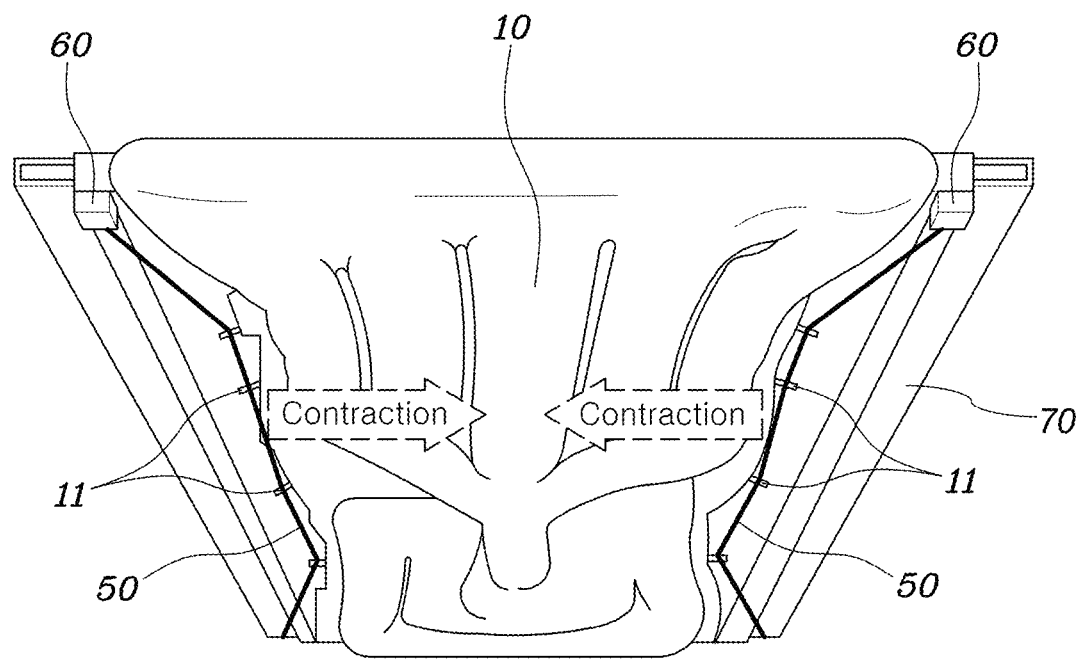
FIG. 3 is a view showing guide wires according to the airbag apparatus of a vehicle shown in FIG. 1.
Figure 4:
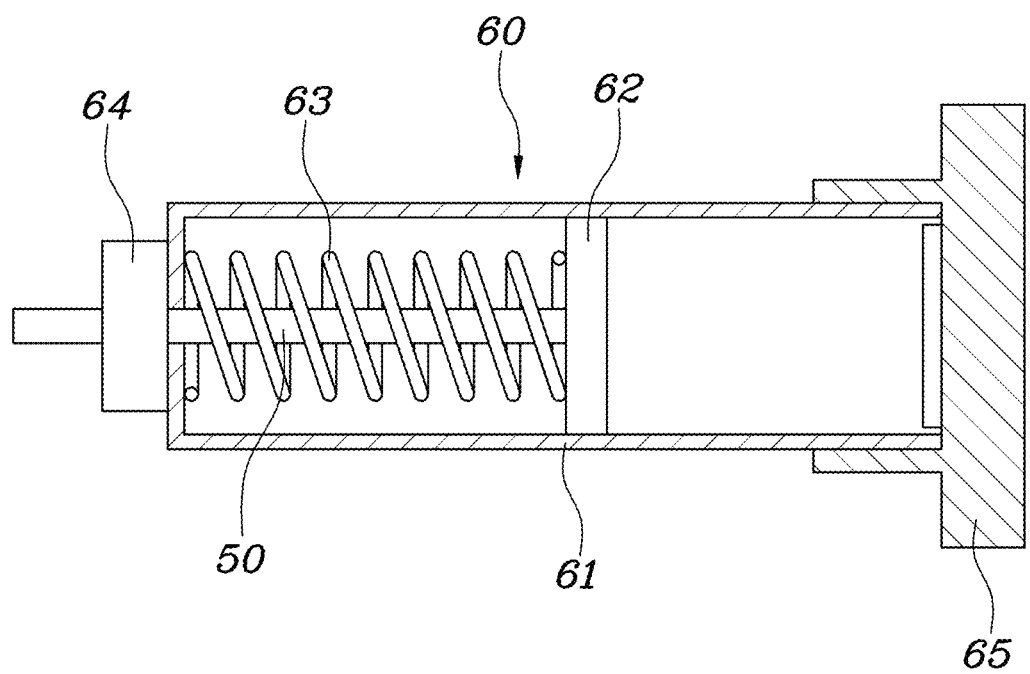
FIG. 4 is a view showing guide holders according to the airbag apparatus of a vehicle shown in FIG. 1.

FIG. 1 is a block diagram showing an airbag apparatus of a vehicle according to the present invention. FIG. 2 is a view showing the airbag apparatus of a vehicle shown in FIG. 1. FIG. 3 is a view showing guide wires according to the airbag apparatus of a vehicle shown in FIG. 1. FIG. 4 is a view showing guide holders according to the airbag apparatus of a vehicle shown in FIG. 1.

As shown in FIGS. 1 and 2, the airbag apparatus of a vehicle according to the present invention includes: an airbag cushion 10 provided at an indoor roof and unfolded along the roof and covering the roof; a plurality of inflators 20 connected to the airbag cushion 10 and supplying gas into the airbag cushion 10, and individually operated; a controller 30 receiving information about an occupant, determining operation of each of the inflators 20 whether a vehicle collision occurs, and determining the number of operated inflators 20 according to the occupant in an event of a vehicle collision.

Herein, the airbag cushion 10 is composed of a roof airbag, and is mounted to the indoor roof and is unfolded in forward and rearward directions of a vehicle to cover the roof, whereby it is possible to prevent an occupant from being directly hit with the roof or from being thrown through an open portion of the roof.

The airbag cushion 10 is supplied with gas from the inflators 20 to expand. Specifically, the plurality of inflators 20 is provided, and the plurality of inflators 20 is individually operated so that an expansion force of the airbag cushion 10 is increased in response to the number of operated inflators 20. Herein, the airbag cushion 10 and the inflators 20 may be provided in one module.

Meanwhile, whether the plurality of inflators 20 is operated is determined by control of the controller 30. The controller 30 receives the information about an occupant, and determines operation of each of the inflators 20 in response to whether a vehicle collision occurs. Herein, the information about the occupant may be the number of occupants in the vehicle room or weight of the occupants. In other words, the expansion force of the airbag cushion 10 is determined by the gas supplied from the inflators 20, and unlike when only one occupant is boarded in the vehicle, when a number of occupants are in the vehicle, the airbag cushion 10 should have the expansion force secured greater, so that the occupants can be safely protected. Furthermore, when one occupant is in the vehicle, due to the excessive expansion force of the airbag cushion 10, the occupant may be injured by the unfolded airbag cushion 10.

Therefore, according to the present invention, the plurality of inflators 20 is connected to the airbag cushion 10, the controller 30 selectively operates the plurality of inflators 20 on the basis of the information of the occupant boarded in the vehicle, so that the airbag cushion 10 may safely protect the occupant.

In describing the present invention in detail, the controller 30 may receive the information about the number of occupants by using a detection sensor 40 provided at the vehicle room, and the controller 30 may increase the number of operated inflators 20 in response to the number of occupants.

Herein, the detection sensor 40 may be a weight sensor provided in a seat or a camera sensor provided in the vehicle room, and the controller 30 may collect the information about the number of occupants that is detected by the detection sensor 40. Therefore, when one occupant is in the vehicle, the controller 30 operates any one inflator 20 of the inflators so that the airbag cushion 10 may protect the occupant with a proper expansion force. Furthermore, when a number of occupants are boarded in the vehicle, the controller 30 operates a plurality of inflators 20, so that the airbag cushion 10 secures an expansion force and safely protects the occupants.

As described above, the number of operated inflators 20 controlled by the controller 30 corresponds to the number of occupants, and the number of operated inflators 20 corresponding to the number of occupants may be preset.

Meanwhile, the controller 30 receives the information about the weight of an occupant by the detection sensor 40 provided in the vehicle room, and the weight of the occupant may increase the number of operated inflators 20.

Herein, the detection sensor 40 may be the weight sensor provided in the seat, and the controller 30 may collect the information about the weight of an occupant by using the detection sensor 40. Therefore, when the weight of an occupant is light, the controller 30 operates any one of the inflators 20, so that the airbag cushion 10 expands with a proper expansion force and safely support the occupant. Furthermore, when the weight of occupant is heavy, the controller 30 operates a plurality of inflators 20, so that the airbag cushion 10 secures an expansion force and thus the occupant can be safely protected.

As described above, the number of operated inflators 20 controlled by the controller 30 corresponds to the weight of occupant, and the number of operated inflators 30 corresponding to the weight of occupant may be preset.

Meanwhile, the controller 30 may control the plurality of the inflators 20, so that each of the plurality of the inflators 20 is operated successively at a preset time interval. As described above, when the plurality of inflators 20 is operated, the controller 30 operates each of the plurality of inflators 20 in order at the preset time interval, so that breakage of the airbag cushion 10 caused by excess gas supply or injuries to the occupant caused by excess expansion force of the airbag cushion 10 are prevented. Herein, the preset time may derived by being tested in advance and may be stored in the controller 30 in advance.

Meanwhile, in order to efficiently unfold the airbag cushion 10, the present invention includes guide wires 50 and the guide holders 60.

The guide wires 50 are provided at opposite portions of the roof, extended along the roof, and connected to opposite ends of the airbag cushion 10 to allow the airbag cushion 10 to be slidable to guide unfolding of the airbag cushion 10.

In other words, as shown in FIG. 2, the guide wires 50 are extended toward the opposite portions of the roof, and the opposite ends of the airbag cushion 10 are connected to the guide wires 50 by a medium of a ring 11, and the airbag cushion 10 in a folded state may be unfolded along the guide wires 50.

Specifically, the guide holders 60 are respectively connected to ends of the guide wires 50, and apply a tension to the guide wires 50. Therefore, in an initial expansion of the airbag cushion 10, as a momentary contraction occurs toward the inside of the airbag cushion 10, the guide wires 50 are pulled by a force by which the airbag cushion 10 contracts. Then, the guide holders 60 compensate deformation of the guide wires 50 in response to contraction of the airbag cushion 10, so that the guide wires 50 are prevented from being damaged. Furthermore, when an occupant is boarded on the airbag cushion 10, the guide wires 50 are deformed in a direction where the occupant is located together with the airbag cushion 10 by the weight of the occupant. Herein, as the guide holders 60 apply a tension to the guide wires 50 so that deformation of the guide wires 50 is recovered, the airbag cushion 10 is recovered to an unfolded shape so as to increase a support force for the occupant, so that the occupant can be safely protected.

In detail, as shown in FIGS. 3 and 4, each of the guide holders 60 may include: a housing 61 mounted to the roof 70 and having an empty portion therein; a slider 62 connected to each of the guide wires 50, the guide wire 50 being inserted into the inside portion of the housing 61 while passing through the housing 61, and moved in the inside portion of the housing 61; and a spring 63 provided in the inside portion of the housing 61 and configured to elastically support the slider 62.

In other words, the slider 62 is movably provided into the housing 61 fixed to the roof 70, and the slider 62 is connected to each of the guide wires 50 while each of the guide wires passes through the housing 61 so that the guide wire 50 and the slider 62 are moved together. In order to achieve assembly efficiency between the guide wires 50 and the slider 62, the housing 61 may have a cap 65 removably provided at an end thereof. Herein, the spring 63 is provided in the inside portion of the housing 61 to elastically support the slider 62, and when the slider 62 is moved with the guide wire 50, the spring 63 contracts and elastically support the slider 62, and the guide wire 50 is recovered to an initial location together with the slider 62 by an elastic recovery force of the spring 63, so that a support force of the airbag cushion 10 may be maintained.

Meanwhile, the guide holders 60 may include a displacement sensor 64 to measure a shift displacement of each of the guide wires 50. The displacement sensor 64 may be provided to match with the guide wire 50 at the guide holder 60 to measure the shift displacement of the guide wire 50. Accordingly, the displacement sensor 64 may be composed of a roller on which the guide wire 50 is wound or of a Hall sensor, thereby measuring the shift displacement of the guide wire 50.

Meanwhile, the controller 30 receives information in response to the shift displacement of the guide wire 50 by the displacement sensor 64, and operates a specific one of the inflators 20 in a vehicle collision to unfold the airbag cushion 10. When the shift displacement of the guide wire 50 is equal to or greater than a pre-stored preset displacement, the controller controls remaining inflators of the inflators 20 such that the remaining inflators 20 are operated. In other words, when it is determined that the shift displacement of the guide wire 50 is large by the displacement sensor 64, a large load is applied to the airbag cushion 10 in response to the number of occupants or the weight of the occupants. Accordingly, when the controller 30 determines that a large load is applied to the airbag cushion 10 as the shift displacement input by the displacement sensor 64 is equal to or larger than the preset displacement, the controller 30 operates the plurality of inflators 20 such that the plurality of inflators 20 is operated, whereby a supporting force of the airbag cushion 10 is increased and the occupant can be safely protected.

In the airbag apparatus of a vehicle, the airbag apparatus being configured as described above, the plurality of inflators 20 is connected to the roof airbag and the plurality of inflators 20 is selectively operated in response to the information of the occupant boarded on the vehicle room, so that the roof airbag expands to be optimize for the occupant to safely protect the occupant.

Although the preferred embodiment of the present invention has been disclosed for illustrative purposes, those skilled in the art will appreciate that various modifications, additions, and substitutions are possible, without departing from the spirit and scope of the present invention.

What is claimed is:

1. An airbag apparatus of a vehicle, the airbag apparatus comprising:

an airbag cushion provided at an indoor roof and being configured to be unfolded along the roof and to cover the roof;

a plurality of inflators connected to the airbag cushion and being configured to supply gas into the airbag cushion, each inflator configured to be individually operated;

a controller being configured to receive information about an occupant, determine operation of each of the inflators in response to whether a vehicle collision occurs, and determine a number of operated inflators in an event of a vehicle collision;

guide wires respectively provided at opposite portions of the roof, and extending along the roof, and being slidingly connected to opposite ends of the airbag cushion to guide unfolding of the airbag cushion, each of the guide wires being configured to be deformed in response to contraction of the airbag cushion or weight of the occupant; and guide holders respectively connected to ends of the guide wires and being configured to apply tension to the guide wires to compensate deformation of the guide wires.

2. The airbag apparatus of claim 1, wherein the controller is configured to receive information about a number of occupants by a detection sensor provided in a vehicle room, and wherein the number of operated inflators is increased in response to the number of occupants.

3. The airbag apparatus of claim 1, wherein the controller is configured to receive weight information of the occupant by a detection sensor provided in a vehicle room, and wherein the number of operated inflators is increased in response to the weight of the occupant.

4. The airbag apparatus of claim 1, wherein the controller is configured to operate the plurality of inflators such that the plurality of inflators is operated successively at preset time intervals.

5. The airbag apparatus of claim 1, wherein each of the guide holders comprises:

a housing mounted to the roof and having an inside portion;

a slider connected to each of the guide wires, the guide wires being inserted into the inside portion of the housing while passing through the housing, the slider being configured to be moved within the inside portion of the housing; and a spring provided in the inside portion of the housing and being configured to elastically support the slider.

6. An airbag apparatus of a vehicle, the airbag apparatus comprising:

an airbag cushion provided at an indoor roof and being configured to be unfolded along the roof and to cover the roof;

a plurality of inflators connected to the airbag cushion and being configured to supply gas into the airbag cushion, each inflator configured to be individually operated;

a controller being configured to receive information about an occupant, determine operation of each of the inflators in response to whether a vehicle collision occurs, and determine a number of operated inflators in an event of a vehicle collision;

guide wires respectively provided at opposite portions of the roof, and extending along the roof, and being slidingly connected to opposite ends of the airbag cushion to guide unfolding of the airbag cushion; and guide holders respectively connected to ends of the guide wires and being configured to apply tension to the guide wires, wherein each of the guide holders comprising a displacement sensor configured to measure shift displacement of each of the guide wires; and the controller being further configured to receive information in response to the shift displacement of each of the guide wires measured by the displacement sensor, operate a specific one of the inflators in an event of a vehicle collision to allow the airbag cushion to be unfolded, and operate a remaining inflator of the inflators when the shift displacement of the guide wire is greater than or equal to a preset displacement.

* * * * *